Patented July 23, 1940

2,209,088

UNITED STATES PATENT OFFICE 2,209,088

COATING COMPOSITION

George D. Martin, Nitro, W. Va., assignor to Monsanto Chemical Company, St. Louis, Mo., a corporation of Delaware No Drawing. Application August 2, 1937, Serial No. 156,952

6 Claims. (Cl. 134—39)

The present invention relates to a coating composition and more particularly to a coating composition containing a drying oil such as for example paint, varnish, enamel and the like.

It is common knowledge that many paints tend to form a film or a "skin" over the surface when exposed in bulk to the air and often during storage in closed containers. This property is particularly noticeable in the presence of certain pigments and with compositions containing appreciable quantities of China-wood oil or polymerized linseed oil. The prevention of skinning is a problem of great importance in dipping operations, since the paint is necessarily exposed to the oxidizing action of the atmosphere during such procedure. Some compositions which otherwise possess desirable properties are not suitable for this type of work because of the rapid formation of a skin on the surface.

A small proportion of a positive oxidation catalyst is usually incorporated in paint compositions in order to obtain a hard dry film in a relatively short time. The dryer is usually a salt of a heavy metal like lead, manganese or cobalt and the incorporation of this so-called dryer results in certain objectionable properties as well as the desirable property of faster drying. Thus, there is a marked tendency of the paint to skin rapidly upon standing in an open container and also during storage. Furthermore, the oxidation of the dry film continues beyond the desired stage with resultant deterioration and cracking.

It is an object of the present invention to provide a drying oil composition of improved properties.

Another object is to provide a drying oil composition of improved resistance to skinning in bulk or in the container.

A further object is to provide a coating composition comprising a drying oil and possessing improved properties.

A still further object is to provide a class of materials which when incorporated in a drying oil composition substantially prevent undesirable oxidation without materially affecting the drying. Other objects will be hereinafter shown.

According to the present invention the undesirable properties of the so-called dryers and the tendency of drying oil compositions, for example paints, varnishes and the like, to develop skins and undesirable oxidation products have been substantially eliminated by the incorporation therein of a small proportion of a sulfurized diaryl amine. More particularly the preferred class of materials comprise the products obtainable by reacting a substituted or unsubstituted diaryl amine with sulfur or a sulfur liberating material. More particularly the preferred class of materials comprise the aromatic thiazine. By aromatic thiazines is meant compounds containing the group

where R is aromatic.

As one method of operating the present invention, portions of paint, varnish or enamel, which readily skin in contact with air, were placed in suitable containers, a small proportion of one of the preferred class of materials incorporated therein and observations made at regular intervals as to the skinning of the composition.

As a specific embodiment of the present invention 20 grams of a quick drying enamel comprising a 25 gallon China-wood oil varnish containing 2.5% of a mixed lead manganese and cobalt dryer was placed in a wide mouth open container of 50 c.c. capacity. 0.03%, based on the total weight of the enamel, of sulfurized diphenyl amine known as thio diphenylamine and possessing a structural formula of

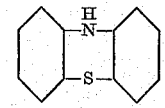

was incorporated therein and a comparison made as to the skinning time of said enamel containing no inhibitor of skin formation, a temperature of 25° C. being maintained throughout the tests. It was noted that this exceedingly minute proportion of inhibitor prevented the formation of a skin for three days whereas the enamel containing no inhibitor skinned in one day.

The very small proportion of inhibitor used above was merely an arbitrarily chosen proportion and can be considerably varied. For example, as a further specific embodiment of this invention, showing that a higher proportion of the preferred class of materials may be employed and as a result prevent the formation of a skin for a longer period of time, 0.5% based on the total weight of the enamel of sulfurized N N' diphenyl para phenylene diamine was incorporated in 20 grams of a typical enamel as described above and observations made on the skinning properties as compared with said enamel containing no inhibitor. It was noted that a thick skin formed in one day on the enamel which did not contain an inhibitor of skin formation but a skin was prevented from forming on the enamel containing the small amount of sulfurized N N' diphenyl para phenylene diamine for ten days. It is apparent that this invention is not restricted to any one proportion of inhibitor of skin formation but may be varied within wide limits depending on the specific composition of the coating material. Generally it is found that less than 1% of the preferred material will be sufficient. Ordinarily from .01 to 0.5% is sufficient. When employed in these quantities the effect of the preferred class of materials on the drying time is not appreciable.

As further specific embodiments of the present invention small amounts of para amino p' oxy thio diphenylamine and thio diphenylamine reacted with acetic anhydride were incorporated in the enamel described above and found to exhibit good anti-skinning action.

As a further specific embodiment of the present invention, 0.1% by weight of one of the preferred class of materials, for example thio diphenylamine, was incorporated in a typical white outside paint. The resulting paint composition was brushed on wood test panels and the painted test panels exposed to the weather for six months in Florida, and compared in an identical test with wood test panels coated in the same manner with the same paint exclusive of the added skin inhibiting or anti-oxidizing agent. At the end of the six months test period the panels coated with the paint containing thio diphenylamine exhibited only very widely scattered cracks which were visible to the naked eye only upon very close examination, while the panels coated with the same paint exclusive of any added anti-oxidizing substance exhibited areas of cracks readily visible to the naked eye. It is thus apparent that surfaces coated with paints and the like containing relatively small proportions of the compounds of the present invention, for example thio diphenylamine, are greatly resistant to weathering and like influences.

As further examples of this invention are thio di αα naphthyl amine; p, p' dihydroxy thio diphenylamine and di (thio α naphthyl) para phenylene diamine. These compounds were prepared by methods well known to those skilled in the art and incorporated in paint as hereinbefore described.

It is obvious that the processes and compositions described herein may be varied widely in their details without departing from the spirit or scope of the present invention. The invention is limited solely by the appended claims.

What is claimed is:

1. A coating composition resistant to weathering in thin film condition containing a vegetable drying oil having incorporated therein from 0.01 to 1.0% of a thiodiphenylamine.

2. A coating composition resistant to weathering in thin film condition containing a vegetable drying oil having incorporated therein a pigment and from 0.01 to 1.0% of thiodiphenylamine.

3. A coating composition characterized by resistance to skin formation in the bulk condition and by resistance to weathering in thin film condition containing a vegetable drying oil of the type which rapidly develops a surface skin in bulk condition having incorporated therein a positive oxidation catalyst and from 0.01 to 1.0% of thiodiphenylamine.

4. The improvement in the manufacture of coating compositions resistant to weathering in thin film condition which comprises mixing a coating composition containing a vegetable drying oil with from 0.01% to 1.0% of a thiodiphenylamine.

5. The improvement in the manufacture of coating compositions resistant to weathering in thin film condition which comprises mixing a coating composition containing a vegetable drying oil and a pigment with from 0.01 to 1.0% of thiodiphenylamine.

6. The improvement in the manufacture of coating compositions resistant to weathering in thin film condition and to the formation of a surface skin in bulk condition which comprises mixing a coating composition containing a vegetable drying oil of the type which rapidly develops a surface skin in bulk condition having incorporated therein a positive oxidation catalyst and from 0.01 to 1.0% of thiodiphenylamine.

GEORGE D. MARTIN.